(12) United States Patent
Leake et al.

(10) Patent No.: US 9,218,356 B2
(45) Date of Patent: Dec. 22, 2015

(54) SYSTEMS AND METHODS FOR ACCELERATING NETWORKING FUNCTIONALITY

(71) Applicants: Edward Nolan Leake, Mountain View, CA (US); James Paul Rivers, Saratoga, CA (US)

(72) Inventors: Edward Nolan Leake, Mountain View, CA (US); James Paul Rivers, Saratoga, CA (US)

(73) Assignee: Cumulus Networks, Inc., Mountain View, CA (US)

( * ) Notice: Subject to any disclaimer, the term of this patent is extended or adjusted under 35 U.S.C. 154(b) by 32 days.

(21) Appl. No.: 13/755,372

(22) Filed: Jan. 31, 2013

(65) Prior Publication Data

US 2014/0214761 A1  Jul. 31, 2014

(51) Int. Cl.
*G06F 17/30* (2006.01)
*H04L 12/933* (2013.01)

(52) U.S. Cl.
CPC ........ *G06F 17/30174* (2013.01); *H04L 49/109* (2013.01)

(58) Field of Classification Search
CPC .................................................. G06F 17/30286
USPC .......................................................... 707/624
See application file for complete search history.

(56) References Cited

U.S. PATENT DOCUMENTS

| | | | |
|---|---|---|---|
| 7,664,045 B2 * | 2/2010 | Ghosh et al. .................. | 370/242 |
| 7,826,461 B2 * | 11/2010 | Okagawa et al. ............. | 370/397 |
| 8,364,796 B2 * | 1/2013 | Hua et al. ...................... | 709/221 |
| 8,423,639 B2 * | 4/2013 | Pope et al. .................... | 709/224 |
| 2004/0078481 A1 * | 4/2004 | Rudd et al. .................... | 709/238 |

* cited by examiner

*Primary Examiner* — Rehana Perveen
*Assistant Examiner* — Hicham Skhoun
(74) *Attorney, Agent, or Firm* — Gina M Steele (57) ABSTRACT

Methods and systems for synchronizing network configuration state tables between an operating system kernel and an attached ASIC switch device are disclosed. An instruction to update a target network configuration state table in either an operating system kernel or an attached ASIC switch device is received. Data from the target network configuration state table and data from a corresponding network configuration state table are retrieved. Values of data in the two tables are compared and an instruction is sent to update the target network configuration state table with one or more values from the corresponding network configuration state table.

42 Claims, 9 Drawing Sheets

SYSTEMS AND METHODS FOR ACCELERATING NETWORKING FUNCTIONALITY

BACKGROUND

The following background description is provided to give context and understanding to the recited invention and is not meant to be limiting of the claims.

Computing Devices

Figure 1:
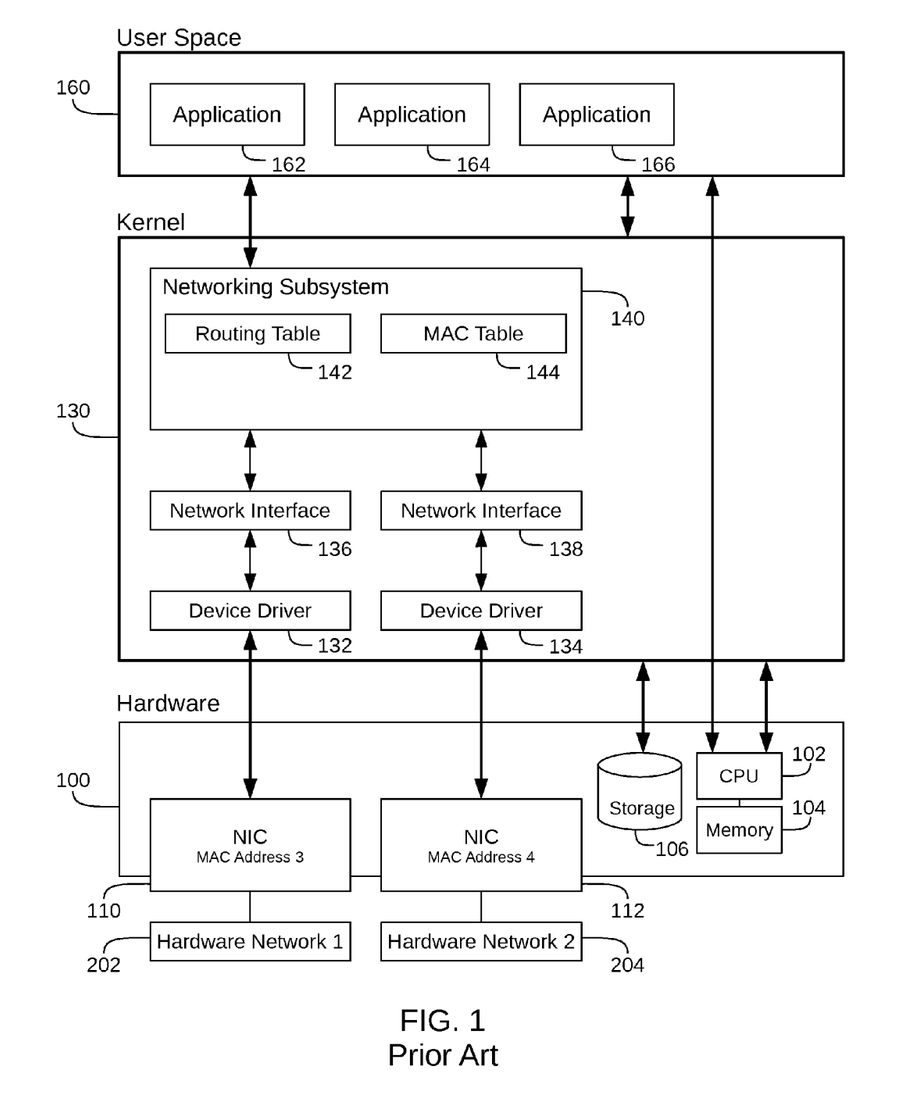
FIG. 1 is a diagram illustrating a computing device with its layers.

Computing devices, such as those that are connected to form a network, are organized in layers. FIG. 1 is a diagram illustrating a computing device with its layers. There is a hardware layer 100, which includes the physical hardware components of the system, such as one or more processors (CPUs) 102, system memory 104, one or more a storage devices 106, and attached peripheral hardware. There is a software layer referred to as "user space" 160, which includes user software applications 162, 164, and 166, such as a text editors, email programs, and web browsers. Between the hardware layer and the user space layer, there is another software layer, the operating system kernel 130, ("the kernel"). The kernel acts as an interface between the computer hardware and the user applications, and includes the software processes that actually run the computer. The kernel is responsible for tasks, such as allocating the CPU and memory among the user application processes, and managing and coordinating input and output "I/O" requests from user applications. For example, the kernel processes messages that user applications send to and receive from other computing devices, so that the messages can be sent over the network hardware.

When a computing device is attached to a network, the hardware layer may also include one or more network interface controllers, ("NICs"), illustrated at 110 and 112 of FIG. 1. NICs are hardware controllers that allow the computing device to be attached to the network's physical media 202 and 204, and that send signals to and receive signals from other computing devices on the network. As used in this application, the physical media for a network includes physical structures, such as wires and fiber optical cables, and also wireless media such as radio waves. A computing device (complete with operating system running) with a NIC connected to a network is often referred to in the art as a "host."

The kernel of a host includes a device driver for each NIC in the host, as illustrated at 132 and 134. Device drivers are kernel software modules that handle input and output "I/O" for specific hardware devices by translating the general I/O instructions of the operating system to specific instructions that the devices, such as a NIC, can understand. Thus, when a computing device sends and receives messages across the network through a particular NIC, the messages are processed by the device driver for the NIC. The kernel also includes a network interface for each NIC, illustrated at 136 and 138. A network interface includes a data structure and functions that define how a NIC device driver needs to present incoming data to the higher levels of the operating system, and how the higher levels of the operating system need to present data to the NIC device driver.

As will be explained in more detail below, when a user space application wants to send a message to another computing device, it forwards the message data and destination information to a networking subsystem in the kernel, illustrated at 140. The networking subsystem processes the message and presents it to the NIC device driver (132 or 134) through the associated network interface (136 or 138). From the device driver (132 or 134) it can be forwarded out of the computing device through the NIC (110 or 112). When a message is received at a NIC, it may be sent to the NIC device driver in the kernel, and presented to the networking subsystem by the network interface.

Computer Networks

Computer networks are also often organized into hardware and software layers. A physical network layer is created, i.e. the hardware layer. Then a software layer is defined for the physical layer. The software layer definition is basically a generalization of the hardware that can be understood by the software layers in the computing devices that may not be constructed from the same type of hardware. Physical networks and software layer definitions are well known in the art of computer science. An Ethernet Network is an example of hardware network, and Internet Protocol version 4, "IP" network, which is used in the Internet, is an example of the software layer definition of a network. To the extent that Ethernet Network protocols and IP are used herein, they are used as examples and are not meant to be limiting. In would be well understood in the relevant art how these examples could be generalized to other hardware networks and software layer network definitions.

Figure 2A:
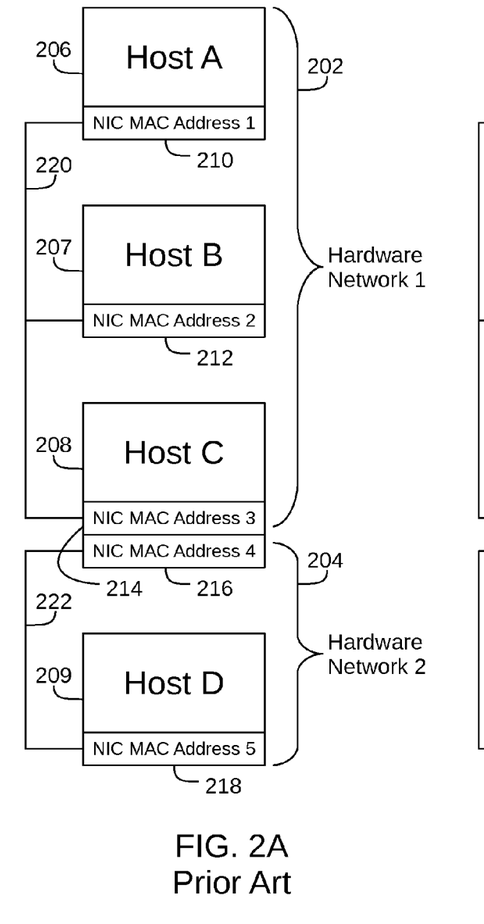
FIG. 2A is a diagram illustrating an example of a hardware layer of a network.

FIG. 2A is a diagram illustrating an example of a hardware layer of a network. As is often the case, the network is made up of smaller networks, illustrated in FIG. 2A as Network 1 202 and Network 2 204. As shown in FIG. 2A, the hardware layer of the network includes a number of NICs 210, 212, 214, 216, and 218, attached to computing devices Host A 206, Host B 207, Host C 208, and Host D 209 respectively, (with Host C including both NIC 214 and 216). Additionally, the network layer includes the physical media 220 and 222 connecting the computing devices. Each NIC in the network is identified by a unique address referred to as a Media Access Control, ("MAC") address. In FIG. 2A, NIC 210 has MAC Address 1, NIC 212 has MAC Address 2, NIC 214 has MAC address 3, NIC 214 has MAC Address 4, NIC 216 has MAC Address 5, and NIC 218 has MAC Address 5.

Figure 2B:
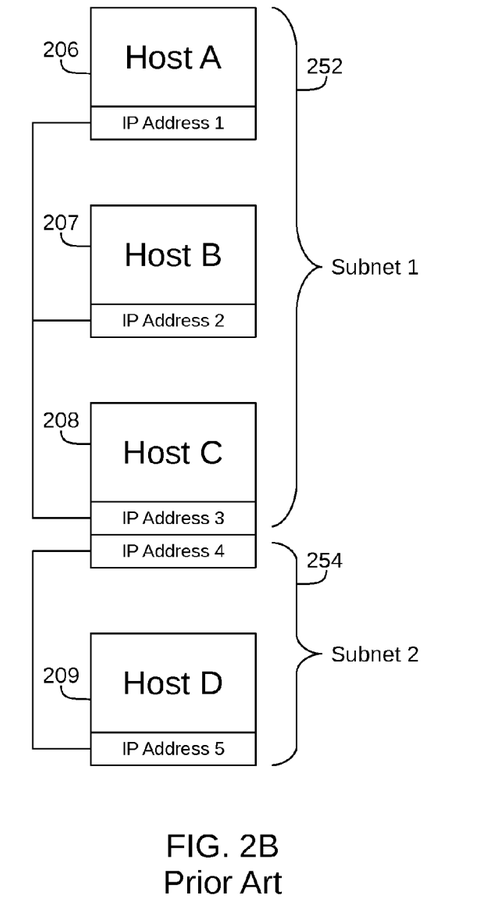
FIG. 2B is a diagram illustrating the software definition of the hardware network illustrated in FIG. 2A.

FIG. 2B is a diagram illustrating the software definition of the hardware network illustrated in FIG. 2A. As illustrated in FIGS. 2A and 2B, the software layer definition of a network is also broken into smaller networks, which often correspond to the smaller networks in the hardware layer. These smaller networks are often referred to as "subnets" in the software layer definition. Each subnet includes at least one computing device linked to the network by a physical medium. In FIGS. 2A and 2B, Subnet 1 252 corresponds to Hardware Network 1 202 and Subnet 2 254 corresponds to Hardware Network 2 204. The hosts on each subnet are typically able to send and receive communications directly to and from hosts on the same subnet. However, for a host (referred to as a "source") to send a message to another host (referred to as a "destination") on a different subnet, the sending host must transmit the message to a "router" or "gateway." The term "router" will be used herein. A router is a host that is connected to more than one subnet, and can transmit a message from one subnet to another subnet. Host C 208 in FIG. 2B is a router because it is connected to both Subnet 1 252 and Subnet 2 254.

Each host in a network generally has a unique software layer address for each subnet on the host, and as is well known in the art, each software layer addresses in the host indicates a subnet that the host is part of. In an IP network, this address is referred to as the "IP address," which is used in this description for clarity. One of skill in the art could generalize the description below to other network software layer protocols. As illustrated in FIG. 2B, Host C has two IP Addresses, (IP Address 3 and IP Address 4) because it is connected to two subnets.

Processing a Message Sent from a Source to a Destination

As explained above, when a user space application (such as an email program) wants to send a message (such as an email), the user space application forwards the message data and destination information to the kernel, where it is processed by the networking subsystem illustrated in FIG. 1 at 140. The term "networking subsystem" is used herein as a broad term to describe the components of the kernel that process messages sent by user space applications before they are forwarded to the network interface, and that process messages from the network interfaces before they are sent to user space applications. A non-limiting example of a networking subsystem is the IP subsystem used to process messages in IP networks.

Figure 3A:
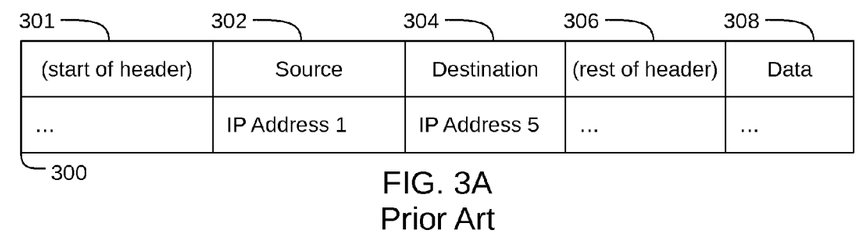
FIG. 3A is a diagram illustrating an example of a packet.

Because messages sent between hosts are often large, the networking subsystem breaks messages into pieces, and sends the messages in "packets." A packet is a bit stream that includes a piece of the message data and information about itself. Packets are defined by a protocol that dictates the structure of the packet, i.e. which bits in the packet contain what type of information. FIG. 3A is a diagram illustrating an example of a packet. An IP packet is shown for illustration purposes. The packet illustrated in FIG. 3A is from a message being sent from Host A 206 to Host D 209 in FIG. 2B. The first set of bits in the packet, which is illustrated at 301, is the start of the header, and includes information such as the protocol of the packet and other information about the packet. The next set of bits, which is illustrated at 302, includes the address of the message source, i.e. the IP Address of Host A, IP Address 1. The next group of bits 304 includes the address of the destination, i.e. the IP Address of Host D, IP Address 5. The bits including the rest of the header are illustrated at 306, and the bits including the actual message data are illustrated at 308.

Figure 4A:
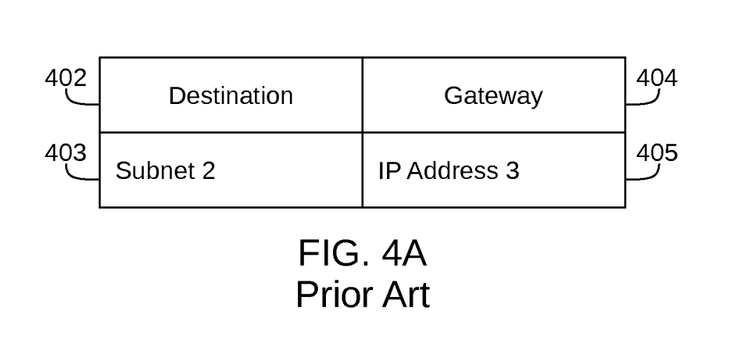
FIG. 4A is a diagram illustrating an example of a routing table.

As explained above, if a packet is sent to a destination in the source's subnet, it may be sent directly to the destination. However, if a packet is sent to a computer outside the source's subnet, it is sent to a router in the source's subnet, such as Host C at 208 of FIG. 2A. Because there may be more than one router on a single subnet, the networking subsystem must determine the appropriate router, by "routing" the packet. To route packets, the networking subsystem looks up the appropriate router for the destination in a routing table, illustrated at 142 in FIG. 1. FIG. 4A is a diagram illustrating a routing table for Host A 206 or Host B 207 of FIG. 2B. A routing table includes two essential columns, the destination's subnet 402, and a software layer address for the appropriate router, or "gateway," 404. As illustrated in FIG. 4A at 403 and 405, any packet from Host A or Host B with a destination on Subnet 2 is sent to IP Address 3, i.e. Host C's software layer address on Subnet 1.

Figure 3B:
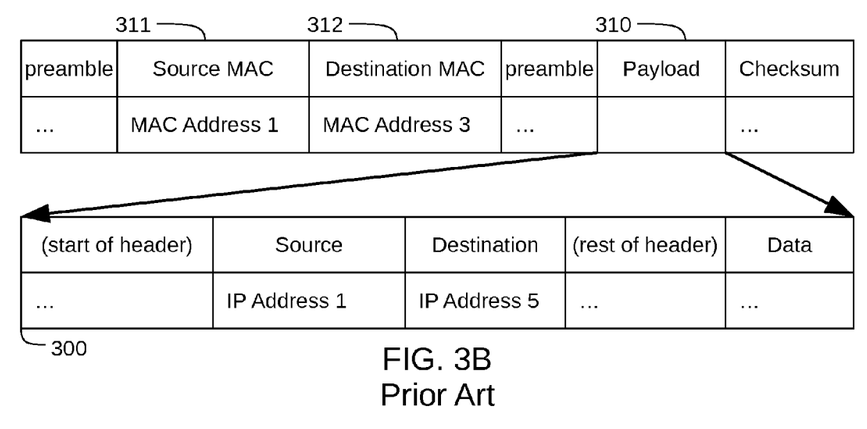
FIG. 3B is a diagram illustrating an example of a frame for sending the packet in FIG. 3A.

Once the software layer address of the router is found in the routing table; however, the networking subsystem will not place that address inside the packet because the destination address in the packet needs to be the actual address for the destination. Additionally, the hardware, such as the network hardware and the media that physically connect the computing devices, does not understand the software layer definitions of the network, such as the software layer addresses and packet construction. Therefore, rather than just sending packets across a hardware network, hosts send bit streams that encapsulate the data for the packet, and include information that the hardware layer understands. Although the name for such bit streams may vary depending on the type of hardware network, the term "frames," will be used herein for simplification. Like a packet, frames are defined by a protocol that dictates their structure, i.e. which bits in the frame contain what type of information. FIG. 3B is a diagram illustrating a frame for sending the packet in FIG. 3A between Host A 206 and Host D 209 in FIGS. 2A and 2B. An Ethernet packet is shown in FIG. 3B for illustrative purposes. As illustrated at 310, the payload of the frame includes the packet shown in 3A.

Figure 4B:
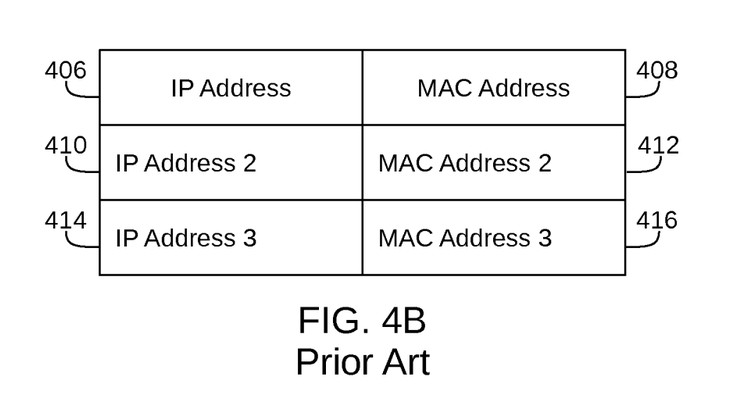
FIG. 4B is a diagram illustrating an example of a MAC table.

As illustrated at 311 and 312 in FIG. 3B, the frame includes the hardware address, e.g. the MAC address of the source or destination, rather than the software layer address. Because the source is Host A, the Source MAC 311 is the address of the NIC 210 in FIG. 2A. The networking subsystem must determine the MAC address for the destination from the software layer address of the router. This is done using an address resolution system that bridges the hardware and software layer addresses. Address resolution systems are well known in the art. A non-limiting example of an address resolution system is the Address Resolution Protocol ("ARP Protocol") used in Ethernet and IP. Address resolution systems use a MAC table illustrated at 144 of FIG. 1, which may also be referred to as an "ARP Table" in Ethernet and IP. A MAC table for Host A is illustrated in FIG. 4B. The MAC table consists of two columns: an IP address 406 and a MAC address 408. As illustrated at 410 and 412, the IP Address 2 for Host B corresponds to MAC Address 2, the hardware address of NIC 2. As illustrated at 414 and 416, the IP Address 3 of Host C (the address for Subnet 1) is associated with MAC Address 3, the hardware address for NIC 214. Thus, in FIG. 3B at 312 the Destination MAC for the frame forwarding the packet to the router Host C is MAC Address 3.

MAC tables and routing tables need occasional updates. For example, the MAC table may not include a destination address for a particular outgoing frame. In such a case, the address resolution system may query other hosts in the network, and update the MAC table when the answer to the query arrives. Additionally, the MAC table may be updated manually. Other methods for updating the MAC table are well known in the art.

Methods for updating routing tables are also well known in the art. For example, a user may update the routing table manually. Additionally, the operating system may run a service implementing a dynamic routing protocol, which updates the routing tables in response to requests from the network. Other methods for updating the routing table are also well known in the art.

Routing tables and MAC tables are examples of forwarding information databases, i.e. the databases used by the networking subsystem to determine the necessary information for forwarding packets. Other examples of forwarding information database include: neighbor tables, IP tables, and Access Control Lists ("ACL") tables. As would be understood by one of skill in the art, these examples are not meant to be limiting.

Once the networking subsystem has determined the Destination MAC address for an outgoing packet, it can finish constructing the frame. The networking subsystem then forwards the complete frame to the next level in the kernel, the network interface (FIG. 1 at 136 and 138) associated with the NIC that has the Source MAC Address. As explained above, the network interface is associated with a particular NIC, and includes a data structure and functions that present frames that are in a standard format from the networking subsystem to the particular NIC device driver. Network interfaces also present incoming frames from a particular NIC device driver to the networking subsystem in a standard format. Each type of NIC requires a different device driver, and therefore a different implementation of the network interface, even though all NICs perform the same basic task, i.e. sending and receiving frames. Each attached NIC has its own network interface.

Figure 3C:
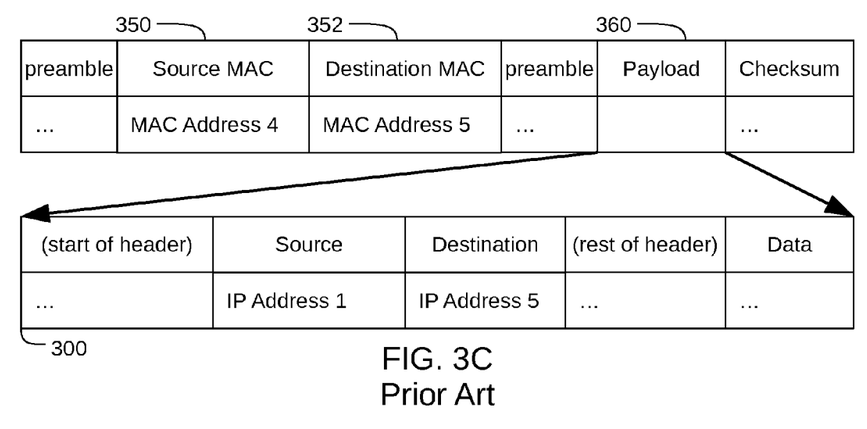
FIG. 3C is a diagram illustrating an example of an updated frame for sending the packet in FIG. 3A.

From the network interface, the frame is forwarded to the NIC device driver to send to the NIC, where it will be transmitted across the network to the Destination MAC. For example, the frame in FIG. 3B is forwarded to NIC 214 on Host C 208 of FIG. 2A, which is also illustrated by NIC 110 of FIG. 1. The frame may then be processed by the networking subsystem at the destination. In such case, the frame is received at the device driver in the host for that NIC. For example, in FIG. 1 the frame would be sent to device driver 132 and then forwarded to network interface 136 where it could be presented to the networking subsystem 140 for processing. The networking subsystem processes the frame by looking at the software layer destination address in the packet, and if the host is not the destination address, constructing an updated frame. The networking subsystem constructs an updated frame in a manner similar to constructing a frame as described above. FIG. 3C is a diagram illustrating an updated frame constructed at Host C 208 of FIGS. 2A and 2B for the packet being sent from Host A 206 to Host D 209. Because Host D is on the same subnet as NIC 216 in Host C, the Source MAC 350 is NIC 216's MAC address, i.e. MAC Address 4. The Destination MAC 352 is the address for the NIC in Host D, i.e. MAC Address 5. The payload 360 is the same packet 300 as in FIGS. 2A and 2B. The updated frame is then forwarded to the network interface 138 associated with NIC 216, which is also illustrated as NIC 112 in FIG. 1. The updated frame is then forwarded to NIC device driver 134, sent to NIC 112, and sent to Host D over the network.

In order to accelerate the processing and forwarding of frames, an attached hardware switch device may be programmed to perform some networking tasks without involving the kernel. However, there are certain networking tasks that may be too complex to implement in the hardware switch. Therefore, it would be useful to have systems and methods for efficiently handing interactions between the programmed switch device and the operating system. It would also be useful to have systems and methods for synchronizing networking data between the operating system and the ASIC switch device.

SUMMARY

The patent relates to systems and methods for synchronizing network configuration state tables between the kernel and an attached ASIC switch device. In some embodiments, when an update is made to a forwarding information database in the operating system kernel, a synchronizing application receives an indication of the update, retrieves data from both the forwarding information database in the operating system kernel and the corresponding forwarding information database in the attached ASIC switch device. The synchronizing application compares the values of the data from the forwarding information database in the operating system kernel and the corresponding forwarding information database in the ASIC switch device to determine which value in the corresponding forwarding information database should be updated. Then a signal is sent to the corresponding forwarding information database in the ASIC switch device to store the updated value.

In some embodiments a synchronizing application receives an instruction to update a target network configuration state table in either an operating system kernel or an attached ASIC switch device. The synchronizing application retrieves data from the target network configuration state table and data from a corresponding network configuration state table. The synchronizing application compares values of the data from the target network configuration state table and the corresponding network configuration state table to determine whether one or more values in the target network configuration state table should be updated. The synchronizing application then sends an instruction to update the target network configuration state table with one or more values from the corresponding network configuration state table.

DETAILED DESCRIPTION

The invention can be implemented in numerous ways, including as a process, an apparatus, a system, a composition of matter, or a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 5:
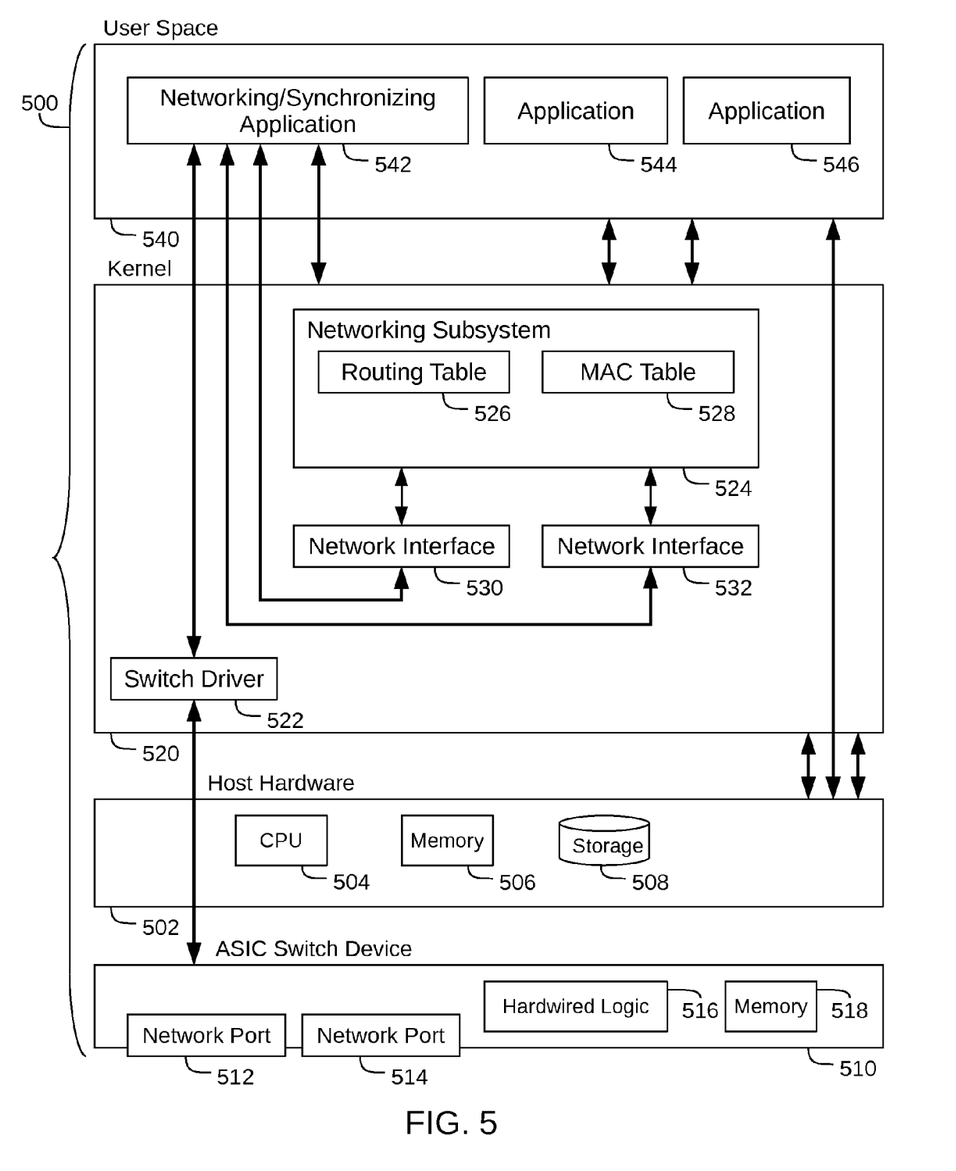
FIG. 5 is a diagram illustrating an example of an environment in which the systems and methods of the present invention may be implemented.

FIG. 5 is a diagram illustrating an example of an environment in which the systems and methods of the present invention may be implemented. As would be well understood in the art, a variety of environments may be used, and this description of the environment is not meant to be limiting. FIG. 5 includes host computing device 500 with hardware 502, kernel space 520, and user space 540. As would be understood in the art, host computing device 500 could be any computing device that can send and receive messages, such as a desktop computer, laptop computer, smart phone or tablet.

Like the host in FIG. 1, the hardware layer 502 includes one or more CPUs 504, memory 506, and one or more storage devices 508. The hardware layer in the environment illustrated in FIG. 5, however, also includes ASIC switch device 510, i.e., a switch device that includes one or more Application Specific Integrated Circuits ("ASICs"). ASICs are specialized chips that include hardwired logic 516 and memory 518 programmed for specific applications. In other words, an ASIC is a specialized computer for performing one or more specific tasks, which it can perform more efficiently than a multipurpose computer. ASIC switch device 510 also includes network ports 512 and 514.

Figure 6:
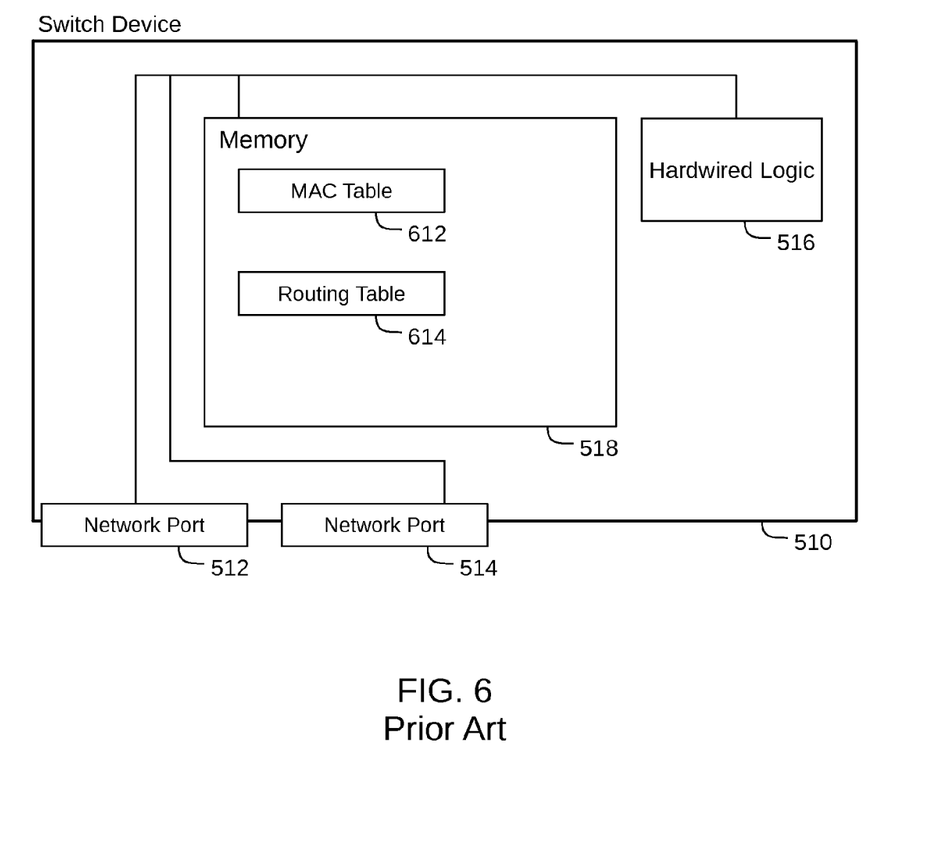
FIG. 6 is a diagram illustrating an example of an ASIC switch device programmed to handle some of the tasks involved in processing and forwarding frames.

ASIC switch device 510 can be programmed to handle some of the tasks involved in processing and forwarding network frames. FIG. 6 is a more detailed illustration of an example of such an ASIC switch device 510. In order for an ASIC switch device to be efficient, a copy of many of the forwarding information databases and other network configuration state tables that are stored in the kernel are also stored in the ASIC memory 518 in the ASIC switch device. Additionally, the ASIC switch device may store values in its own forwarding information databases and other network configuration state tables that would be useful to the kernel.

FIG. 6 illustrates forwarding information databases, MAC table 612 and routing table 614, stored in ASIC memory 518. The ASIC memory may also include other network configuration state tables, including other forwarding information databases, as would be well understood in the art. FIG. 8B illustrates examples of some of these tables, which are described in more detail below.

With programming, the ASIC switch device could handle some tasks without involving the kernel. For example, if the frame illustrated above in FIG. 3B arrived in the ASIC switch device, the process of analyzing the frame and creating the updated frame illustrated in FIG. 3C could be handled in the ASIC switch device provided the memory included the relevant data. The updated frame could then be forwarded by the switch device and sent across the network to its destination. Thus, the frame could be processed and forwarded without involving the kernel, resulting in improved efficiency. There are, however, tasks that may be too complex to be handled by the specialized programming in the ASIC switch device. For example, a routing table or MAC table may not have the relevant information to forward a frame. In such cases, methods like those described above, such as running dynamic routing protocols or address resolutions systems, may be needed to learn the necessary information. Because these methods may be too complex for the ASIC switch device, it would be useful to have systems and methods that allow for frames in such circumstances to be forwarded to the kernel for processing. Additionally, it would be useful to have systems and methods for synchronizing the networking data stored in the kernel and in the ASIC switch device.

Examples of the type of tasks that may be handled in the ASIC switch device and the type that may be handled by the kernel are provided for illustration purposes only. The patented invention is not limited by which tasks are performed in the kernel and which are performed in the ASIC switch device.

Returning to FIG. 5, kernel 520 includes networking subsystem 524, which would be similar to networking subsystem 140 in FIG. 1 described above. Like networking subsystem 140, networking subsystem 524 includes forwarding information databases, such as routing table 526 and MAC table 528. Kernel 520 also includes network interfaces associated with the ASIC Switch device, as illustrated at 530 and 532. Network interfaces 530 and 532 receive frames from the networking application, rather than directly from a device driver for a NIC.

User space 540 includes applications 542, 544, and 546. User space application 542 is a networking/synchronizing application that handles interactions between the ASIC switch device and the kernel, which may include synchronizing data between the two. In some embodiments, the networking application and the synchronizing application may be part of the same application as illustrated at 542 of FIG. 5, or they may be separate applications in other embodiments.

For illustrative purposes, the networking/synchronizing application is shown in user space, but this is not meant to be limiting. For example, the networking application and/or the synchronizing application may also be kernel space applications.

Figure 7A:
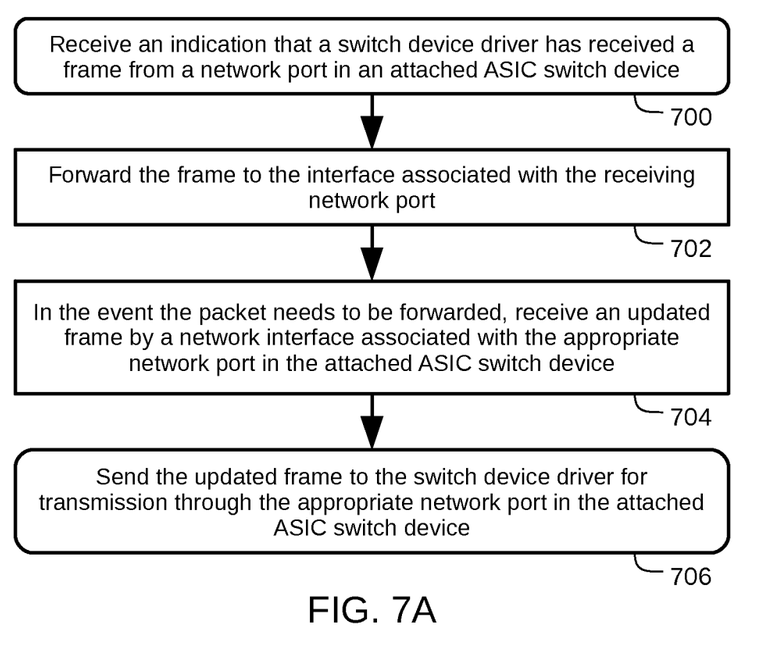
FIG. 7A is a flowchart illustrating one embodiment of a method for handling interactions between computing devices in a network.

FIG. 7A is a flowchart illustrating one embodiment of a method for processing messages in a network. At step 700, a networking application, such as the one shown in FIG. 5 at 542, receives an indication that a switch device driver has received a frame from a network port in an attached ASIC switch device. The phrase "switch device driver has received a frame from a network port" is used broadly to describe a frame that was received by the network port and forwarded to the switch device driver, and does not require that the switch device driver receive the frame directly from the network port. An explained above, the term "frame" is used herein as a general term to describe a bit stream encapsulating a packet, such as an Ethernet frame. Frames are illustrated in FIGS. 3B and 3C. The frame may have been forwarded to the switch device driver because the ASIC switch device did not have the requisite information to update the frame and forward it to another computing device. For example, one of the forwarding information databases in the ASIC switch device, such as the MAC table at 528 of FIG. 5 or the routing table at 526 may have been missing required information. However, the systems and methods of the present invention handle the frame once it has been received by the switch device driver, and therefore, the processing of the frame in the ASIC switch device and the reason the frame was sent to the switch device driver do not limit the present invention.

At step 702 of FIG. 7A, the frame is forwarded to a network interface associated with the network port in the attached ASIC switch device 510 that it was received from. For example, in FIG. 5 network interface 530 may be associated with network port 512 and network interface 532 may be associated with network port 514. The networking application 542 may keep track of which network port in the ASIC switch device each network interface is associated. The network interface has the capability of allowing the networking subsystem in the kernel 524 to process the frame. Where network interfaces 136 and 138 of FIG. 1 are associated with particular NICs, network interfaces 530 and 532 are associated with particular network ports in the ASIC switch device. The kernel may include virtualized NICs that make it appear that a packet received on a particular ASIC network port was received by a corresponding virtual NIC. These interfaces can present a frame from a particular network port in the ASIC switch device, to the networking subsystem so that the frame can be processed by the networking subsystem in the kernel. Network interfaces 530 and 532 receive frames from the networking application 542, rather than directly from the device driver for the particular NIC. Once the network interface has received the frame, the frame is presented to the networking subsystem 524, allowing it to be processed in a manner similar to that described in the background section with reference to networking subsystem 140 of FIG. 1.

In the event that a packet in the frame needs to be forwarded to a second computing device, the kernel networking interface associated with the appropriate network port in the ASIC switch device will receive the updated frame after the frame has been processed by the networking subsystem at 704 of FIG. 7A. At step 706, the updated frame is sent to the switch device driver to be transmitted to the appropriate network port in the ASIC switch device.

Figure 7B:
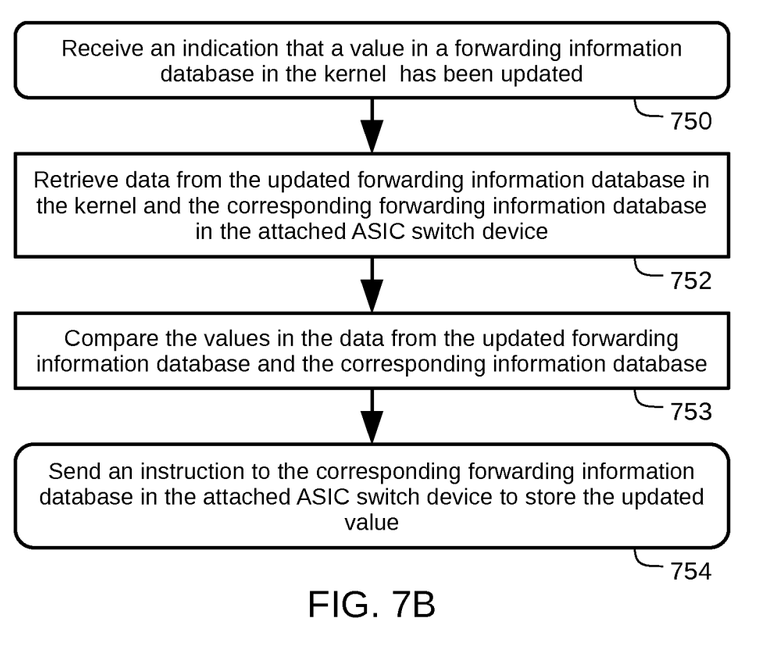
FIG. 7B is a flow chart illustrating one embodiment of a method for synchronizing data between a kernel and an ASIC switch device.

As explained above in the background section, the networking subsystem may need to learn new forwarding information to construct or update a frame, using a variety of methods that are well known in the art. The networking subsystem updates one or more values in a forwarding information database with the learned information. In some embodiments of the invention, a synchronizing application may receive an indication of such an update and synchronize data between the kernel and ASIC switch device. FIG. 7B is a flow chart for one embodiment of a method for synchronizing data between the kernel and the ASIC switch device.

At step 750 of FIG. 7B, the synchronizing application receives an indication that an update has been made to a forwarding information database in the kernel. At step 752, data is retrieved from the updated forwarding information database in the kernel and the corresponding forwarding information database in the attached ASIC switch device. The "corresponding forwarding information database" in the attached ASIC switch device refers to the database in the ASIC switch device for storing the updated value. As discussed above with regard to FIG. 6, to perform some functionality for processing frames, the memory in the attached ASIC switch device stores forwarding information database corresponding to those in the kernel, for example, MAC table 612 and routing table 614 in FIG. 6.

At step 753, the synchronizing application compares the values in the data from the updated forwarding information database in the kernel and the corresponding forwarding information database in the ASIC switch device to determine which value in the corresponding forwarding information database should be updated. At step 754, an instruction is sent to the attached ASIC switch device to store the updated value in the corresponding forwarding information database.

In some embodiments, the synchronizing application compares the retrieved data from the forwarding information database in the kernel and the retrieved data from the corresponding forwarding information database in the ASIC switch device, and determines if there are one or more additional updated values. In the event that there are one or more updated values, an instruction is sent to store each updated value in the corresponding information forwarding database, i.e., the forwarding information database that stores the same data, but is stored in a different location.

Methods for determining if there are one or more additional values would be well understood in the art, and the particular method chosen does not limit the invention. For example, in some embodiments, the synchronizing application may sort the two tables and then iterate over them to determine if there are any differences in corresponding values. In other embodiments, the synchronizing application loads the table from the ASIC switch device into a hash table, and looks at each of the kernel table's values in the hash table associated with the kernel table. If the entry does not exist in the hash table for the ASIC switch device, the value is new. In such case, the synchronizing application sends an indication to store the new value in the ASIC switch device table. If the entry in the hash table for the ASIC switch device exists, but has a different associated state from the entry for the kernel hash table, the value has been changed. In such cases, the synchronizing application sends an instruction to store the changed value in the ASIC switch device table. In some such embodiments, if after processing all the entries in the kernel hash table, there are any entries in the ASIC hash table that have not been marked as "touched" by the previous two cases, the synchronizing application sends an instruction to delete the entry in the forwarding information database in the ASIC switch device. In some embodiments, when an indication of an update to a forwarding information database is received, the synchronizing application retrieves data from one or more additional network configuration state tables in both the kernel and the ASIC switch device. Network configuration state tables are illustrated in FIG. 8 and are discussed in more detail below. In such embodiments, the data in each additional network configuration state table in the kernel is compared to the data in the corresponding configuration state table in the ASIC switch device to determine if there are any differences in the corresponding values, and if so, which value is the updated value. As explained below, determining which value is an updated value would be well understood in the art, and may be performed in a variety of different methods, the choice of which does not limit the invention. If there are any updated values, a signal is send to store the updated value in the corresponding network configuration state table.

Figure 8A:
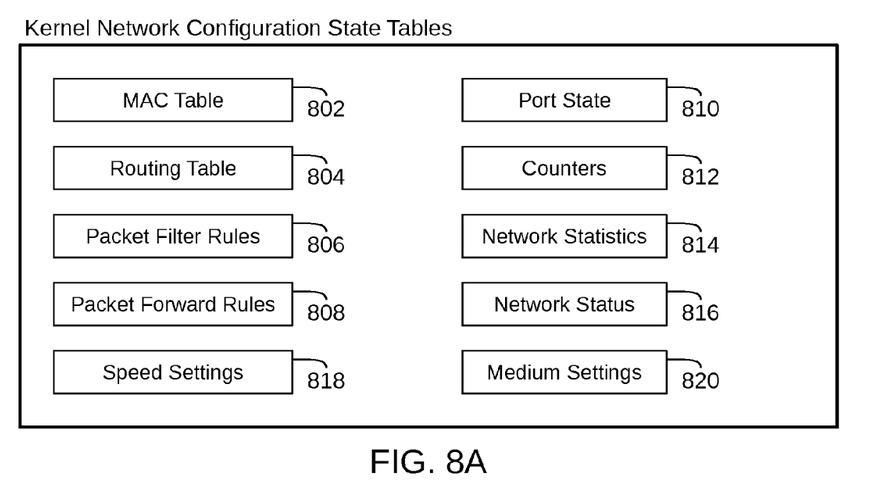
FIG. 8A is a diagram illustrating examples of network configuration state tables in the kernel.
Figure 8B:
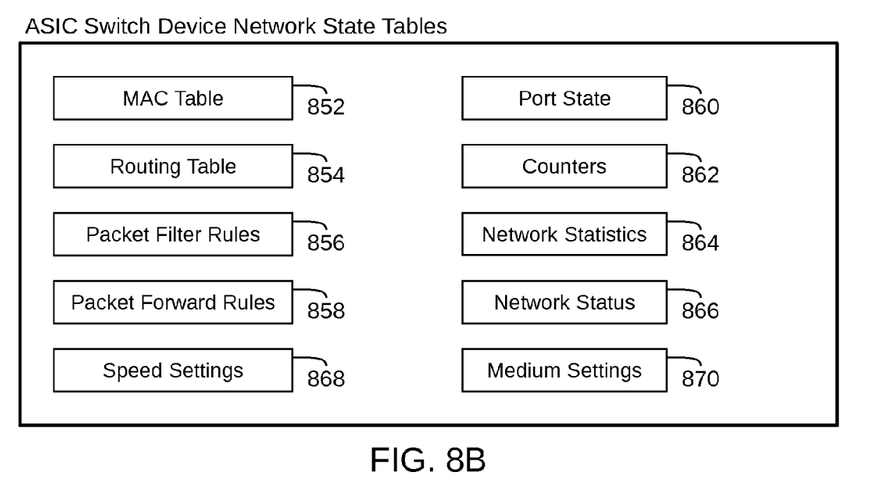
FIG. 8B is a diagram illustrating examples of the corresponding network configuration state tables in an ASIC switch device.

FIG. 8A is a diagram illustrating examples of network configuration state tables in the kernel and FIG. 8B is a diagram illustrating examples of the corresponding network configuration state tables in the ASIC switch device. The term "network configuration state table" is used broadly to describe any structure for storing one or more values that affect aspects of network operations. As such, "a network configuration state table" may include a variable, a database table, or any other data structure. In some embodiments, the network configuration state tables are stored in the cache.

Nonlimiting examples of network configuration state tables include forwarding information databases, such as MAC tables illustrated at 802 and 852, and routing tables illustrated at 804 and 854. Other examples of network configuration state tables include the packet filter rules, illustrated at 806 and 856 and the packet forwarding rules, illustrated at 808 and 858. Other examples include the port state illustrated at 810 and 860. Additional examples include counters, illustrated at 812 and 862. Other examples include network status tables, illustrated at 816 and 866, which include data such as the variable for storing whether the network port interface is "up" or "down," and the link state. Additional types of network configuration state tables include the tables for storing network statistics, as illustrated at 814 and 864. Network statistics include information collected by the ASIC hardware, such as the number of frames sent and received, the number of IP packets sent and received, number of packets forwarded, number of packets filtered, number of packets filtered based on a TCP port, number of packets bound for certain hosts, if there were any malformed or otherwise erroneous packets or frames, if transmitted packets had any routing problems upstream, and many other variants that would be well understood in the art. Other types of network configuration tables include speed settings illustrated at 818 and 868 and medium settings illustrated at 820 and 870. Other types of network configurations tables would be well understood in the art. The patented invention is not limited by which type of network configuration state tables are synchronized.

In describing the network configuration state tables, the term "corresponding table" is used to describe the table storing the same type of data, but saved in a different location. For example, the MAC table 802 in the kernel is the corresponding table for the MAC table 852 in the ASIC switch device, and vice versa. The term "corresponding value" is used to describe the value stored in the corresponding table for the same type of data.

Figure 9:
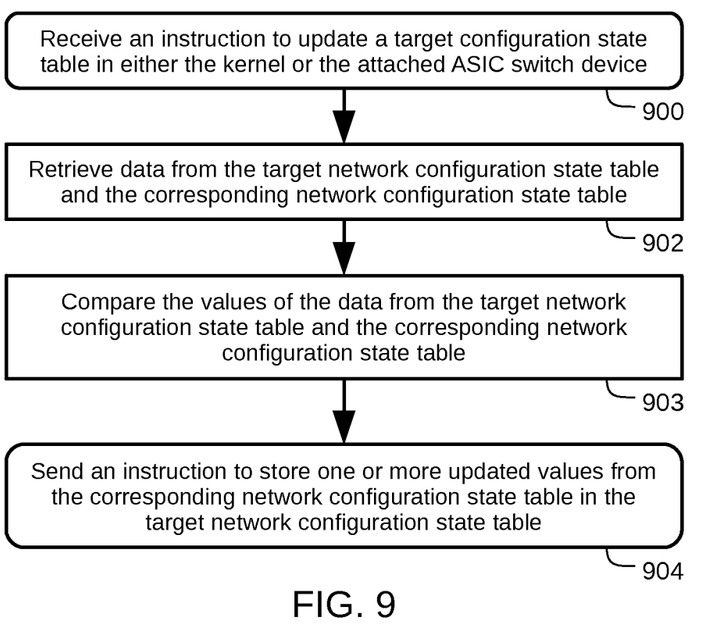
FIG. 9 is a flow chart illustrating one embodiment of a method for synchronizing network configuration state tables between a kernel and an ASIC switch device.

FIG. 9 is a flow chart for an embodiment of a method for synchronizing network configuration state tables between the kernel and the ASIC. This method may be performed by a synchronizing application, which as explained above may be part of the networking application illustrated at 542 of FIG. 5. The synchronizing application may be in user space as illustrated, or in kernel space.

At step 900, a synchronizing application receives an instruction to update a target network configuration state table in either the kernel or the attached ASIC switch device. "Synchronizing application" is a term used broadly to describe an application that performs synchronizing. The "target" network configuration state table simply refers to the table to be updated.

It would be well understood in the art that there are a variety of ways in which the application may receive the instruction to update a target configuration state table, the choice of which does not limit the invention. In some embodiments the instruction is received in response to particular events. For example, the instruction may be received in response to the kernel updating one of its network configuration state tables, such as a forwarding information database. In some embodiments, the instruction may occur at startup. In some embodiments, a process monitors changes in the network configuration state tables, by a polling message, a message from the operating system used to notify processes or changes, or any of the other mechanisms for notification of changes that would be well understood in the art, and sends an instruction when one or more changes have occurred. In some embodiments, the instruction is received in response to a certain number of values in network configuration state table being updated. In some embodiments, the instruction is received in response to the operating system state become incomplete or invalid.

At step 902, the synchronizing application retrieves data from the target network configuration state table and the corresponding network configuration state table.

At step 903, the synchronizing application compares values of the data from the target network configuration state table and the corresponding network configuration state table to determine whether one or more values in the target network configuration state table should be updated. Methods for determining one or more values in the target network configuration state table that should be updated would be well understood in the art, and the particular method chosen does not limit the invention. For example, in some embodiments, the synchronizing applications may sort the two tables and then iterate over them. In other embodiments, the synchronizing application may load the table from the ASIC switch device a hash table, and looks at each of the kernel table's values in the hash table using a method similar to the one described above.

At step 904, an instruction is sent to store in the target network configuration state table, one or more updated values from the corresponding network configuration state table. The methods for sending such an instruction would be well understood in the art.

In some embodiments, the synchronizing application retrieves data from one or more additional network configuration state tables in the both the kernel and the attached ASIC switch device. For purposes of clarity of discussion, each network configuration state table other than the target table and its corresponding table is referred to as an "additional network configuration state table," and its corresponding table is referred to as the "corresponding additional network configuration state table."

In such embodiments, data from the one or more network configuration state table in the kernel is compared to the one or more corresponding additional network configuration state table in the attached ASIC switch device, to determine if there are any differences in the corresponding values. For each difference in the corresponding values, it is determined which value is "an updated value." An instruction is then sent to store each updated value is in the corresponding additional network configuration state table. Methods for determining which value is an updated value would be well understood in the art, and the particular method chosen does not limit the invention. Method would include methods for comparing data in the two tables similar to the methods described above for determining which value was an updated value.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims. Further, the present invention is not to be considered limited to a particular software protocol or a particular hardware network.

What is claimed is:

1. A system for processing messages in a network comprising a processor and a memory coupled with the processor, wherein the memory is configured to provide the processor with instructions for:

receiving by a networking application in a host, an indication that a switch device driver in an operating system in the host has received a frame from a network port in an attached ASIC switch device;

forwarding the frame to a network interface in the software layer of the host associated with the network port in the attached ASIC switch device, such network interface having the capability of allowing the networking subsystem in an operating system kernel of the host to process the frame;

in the event that processing the frame results in an update to a value in a forwarding information database in an operating system kernel of the host, receiving by a synchronizing application an indication that the update had been made;

retrieving by the synchronizing application, data from both the forwarding information database in the operating system kernel of the host and the corresponding forwarding information database stored in the attached ASIC switch device;
comparing values of the data from the forwarding information database in the operating system kernel of the host and the corresponding forwarding information database stored in the attached ASIC switch device to determine which value in the corresponding forwarding information database stored in the attached ASIC switch device should be updated;
sending a signal to the corresponding forwarding information database stored in the attached ASIC switch device to store the updated value;
wherein the host includes a computing device with a network interface controller and an operating system kernel running; and
wherein the networking subsystem in the operating system kernel of the host includes the components of the kernel that process messages sent by user space applications before they are forwarded to a network interface.

2. The system of claim 1 wherein the memory is further configured to provide the processor with instructions for;
determining if there are one or more additional updated values in either forwarding information database; and
in the event there are one or more additional updated values, for each additional updated value, sending a signal to store the additional updated value in a corresponding forwarding information database.

3. The system of claim 2 wherein the memory is further configured to provide the processor with instructions for:
retrieving data from an additional network configuration state table in the operating system kernel in the host and a corresponding additional network configuration state table stored in the attached ASIC switch device;
comparing data from the additional network configuration state table in the operating system kernel in the host to the corresponding additional network configuration state table stored in the attached ASIC switch device and determining if there are one or more differences in corresponding values;
in the event there are one or more differences in corresponding values, determining which value is an updated value; and
sending an instruction to store the updated value in either the additional network configuration state table in the operating system kernel in the host or the corresponding additional network configuration state table in the attached ASIC switch device.

4. A system for synchronizing network configuration state comprising a processor and a memory coupled with the processor, wherein the memory is configured to provide the processor with instructions for:
receiving by a synchronizing application in a host, an instruction to update a target network configuration state table in either an operating system kernel of the host or stored in an attached ASIC switch device;
retrieving by the synchronizing application in the host, data from the target network configuration state table and data from a corresponding network configuration state table;
comparing the values of the data from the target network configuration state table and the corresponding network configuration state table to determine one or more values in the target network configuration state table that need be updated;
sending an instruction to update the target network configuration state table with one or more values from the corresponding network configuration state table;
wherein the host includes a computing device with a network interface controller and an operating system kernel running;
wherein the corresponding network configuration state table is stored in the attached ASIC switch device if the target network configuration state table is in an operating system kernel of the host; and
wherein the corresponding network configuration state table is in an operating system kernel of the host if the target network configuration state table is stored in the ASIC switch device.

5. The system of claim 4 wherein the synchronizing application receives the instruction from a process that monitors changes in the network configuration state tables in both the operating system kernel in the host and stored in the attached ASIC switch device.

6. The system of claim 5 wherein the monitor process involves either a polling message or a message from the operating system used to notify processes of changes.

7. The system of claim 4 wherein the synchronizing application receives the instruction in response to the operating system state becoming incomplete or invalid; and wherein the target network configuration state table is in the operating system kernel in the host and the corresponding network configuration state table is stored in the attached ASIC switch device.

8. The system of claim 4 wherein the synchronizing application receives the instruction after a certain number of values in one or more network configuration state tables have been updated and wherein the memory is configured to provide the processor with further instructions for
retrieving data from each network configuration state table with an updated value and retrieving data from each corresponding target network configuration state table; and
for each of the updated values, sending an instruction to update the corresponding target network configuration state table with the updated value.

9. The system of claim 4 wherein the target network configuration state table and the corresponding network configuration state table are forwarding information databases.

10. The system of claim 9 wherein the target network configuration state table and the corresponding network configuration state table are one of the following: a routing table or a MAC table.

11. The system of claim 4 wherein the target network configuration state table and the corresponding network configuration state table store one of the following: a port state, one or more counters, one or more speed settings or one or more medium settings.

12. The system of claim 4 wherein the target network configuration state table and the corresponding network configuration state table store one of the following: one or more network statistics or a network status.

13. The system of claim 4 wherein the target network configuration state table and the corresponding network configuration state table store one of the following: one or more packet filter rules or one or more packet forward rules.

14. The system of claim 5 wherein the updated network configuration state table and the target network configuration state table are stored in cache.

15. A method for processing messages in a network comprising:

receiving by a networking application in a host, an indication that a switch device driver in an operating system in the host has received a frame from a network port in an attached ASIC switch device;

forwarding the frame to a network interface in the software layer of the host associated with the network port in the attached ASIC switch device, such network interface having the capability of allowing the networking subsystem in an operating system kernel of the host to process the frame;

in the event that processing the frame results in an update to a value in a forwarding information database in an operating system kernel of the host, receiving by a synchronizing application an indication that the update had been made;

retrieving by the synchronizing application, data from both the forwarding information database in the operating system kernel of the host and the corresponding forwarding information database stored in the attached ASIC switch device;

comparing values of the data from the forwarding information database in the operating system kernel of the host and the corresponding forwarding information database stored in the attached ASIC switch device to determine which value in the corresponding forwarding information database stored in the attached ASIC switch device should be updated;

sending a signal to the corresponding forwarding information database stored in the attached ASIC switch device to store the updated value;

wherein the host includes a computing device with a network interface controller and an operating system kernel running; and wherein the networking subsystem in the operating system kernel of the host includes the components of the kernel that process messages sent by user space applications before they are forwarded to a network interface.

16. A computer program product for processing messages in a network, the computer program product being embodied in a non-transitory machine readable storage medium and comprising computer instructions for:

receiving by a networking application in a host, an indication that a switch device driver in an operating system in the host has received a frame from a network port in an attached ASIC switch device;

forwarding the frame to a network interface in the software layer of the host associated with the network port in the attached ASIC switch device, such network interface having the capability of allowing the networking subsystem in an operating system kernel of the host to process the frame;

in the event that processing the frame results in an update to a value in a forwarding information database in an operating system kernel of the host, receiving by a synchronizing application an indication that the update had been made;

retrieving by the synchronizing application, data from both the forwarding information database in the operating system kernel of the host and the corresponding forwarding information database stored in the attached ASIC switch device;

comparing values of the data from the forwarding information database in the operating system kernel of the host and the corresponding forwarding information database stored in the attached ASIC switch device to determine which value in the corresponding forwarding information database stored in the attached ASIC switch device should be updated;

sending a signal to the corresponding forwarding information database stored in the attached ASIC switch device to store the updated value;

wherein the host includes a computing device with a network interface controller and an operating system kernel running; and wherein the networking subsystem in the operating system kernel of the host includes the components of the kernel that process messages sent by user space applications before they are forwarded to a network interface.

17. A method for synchronizing network configuration state comprising:

receiving by a synchronizing application in a host, an instruction to update a target network configuration state table in either an operating system kernel of the host or stored in an attached ASIC switch device;

retrieving by the synchronizing application in the host, data from the target network configuration state table and data from a corresponding network configuration state table;

comparing the values of the data from the target network configuration state table and the corresponding network configuration state table to determine one or more values in the target network configuration state table that need be updated;

sending an instruction to update the target network configuration state table with one or more values from the corresponding network configuration state table;

wherein the host includes a computing device with a network interface controller and an operating system kernel running;

wherein the corresponding network configuration state table is stored in the attached ASIC switch device if the target network configuration state table is in an operating system kernel of the host; and wherein the corresponding network configuration state table is in an operating system kernel of the host if the target network configuration state table is stored in the ASIC switch device.

18. A computer program product for synchronizing network configuration state, the computer program product being embodied in a non-transitory machine readable storage medium and comprising computer instructions for:

receiving by a synchronizing application in a host, an instruction to update a target network configuration state table in either an operating system kernel of the host or stored in an attached ASIC switch device;

retrieving by the synchronizing application in the host, data from the target network configuration state table and data from a corresponding network configuration state table;

comparing the values of the data from the target network configuration state table and the corresponding network configuration state table to determine one or more values in the target network configuration state table that need be updated;

sending an instruction to update the target network configuration state table with one or more values from the corresponding network configuration state table;

wherein the host includes a computing device with a network interface controller and an operating system kernel running;

wherein the corresponding network configuration state table is stored in the attached ASIC switch device if the target network configuration state table is in an operating system kernel of the host; and wherein the corresponding network configuration state table is in an operating system kernel of the host if the target network configuration state table is stored in the ASIC switch device.

19. The method of claim 15 further comprising:

determining if there are one or more additional updated values in either forwarding information database; and in the event there are one or more additional updated values, for each additional updated value, sending a signal to store the additional updated value in a corresponding forwarding information database.

20. The method of claim 19 further comprising:

retrieving data from an additional network configuration state table in the operating system kernel in the host and a corresponding additional network configuration state table stored in the attached ASIC switch device;

comparing data from the additional network configuration state table in the operating system kernel in the host to the corresponding additional network configuration state table stored in the attached ASIC switch device and determining if there are one or more differences in corresponding values;

in the event there are one or more differences in corresponding values, determining which value is an updated value; and sending an instruction to store the updated value in either the additional network configuration state table in the operating system kernel in the host or the corresponding additional network configuration state table in the attached ASIC switch device.

21. The computer program product of claim 16 comprising further computer instructions for:

determining if there are one or more additional updated values in either forwarding information database; and in the event there are one or more additional updated values, for each additional updated value, sending a signal to store the additional updated value in a corresponding forwarding information database.

22. The computer program product of claim 21 comprising further computer instructions for:

retrieving data from an additional network configuration state table in the operating system kernel in the host and a corresponding additional network configuration state table stored in the attached ASIC switch device;

comparing data from the additional network configuration state table in the operating system kernel in the host to the corresponding additional network configuration state table stored in the attached ASIC switch device and determining if there are one or more differences in corresponding values;

in the event there are one or more differences in corresponding values, determining which value is an updated value; and sending an instruction to store the updated value in either the additional network configuration state table in the operating system kernel in the host or the corresponding additional network configuration state table in the attached ASIC switch device.

23. The method of claim 17 wherein the synchronizing application receives the instruction from a process that monitors changes in the network configuration state tables in both the operating system kernel in the host and stored in the attached ASIC switch device.

24. The method of claim 23 wherein the monitor process involves either a polling message or a message from the operating system used to notify processes of changes.

25. The method of claim 17 wherein the synchronizing application receives the instruction in response to the operating system state becoming incomplete or invalid; and wherein the target network configuration state table is in the operating system kernel in the host and the corresponding network configuration state table is stored in the attached ASIC switch device.

26. The method of claim 17 wherein the synchronizing application receives the instruction after a certain number of values in one or more network configuration state tables have been updated, and wherein the method further comprises:

retrieving data from each network configuration state table with an updated value and retrieving data from each corresponding target network configuration state table; and for each of the updated values, sending an instruction to update the corresponding target network configuration state table with the updated value.

27. The method of claim 17 wherein the target network configuration state table and the corresponding network configuration state table are forwarding information databases.

28. The method of claim 27 wherein the target network configuration state table and the corresponding network configuration state table are one of the following: a routing table or a MAC table.

29. The method of claim 17 wherein the target network configuration state table and the corresponding network configuration state table store one of the following: a port state, one or more counters, one or more speed settings or one or more medium settings.

30. The method of claim 17 wherein the target network configuration state table and the corresponding network configuration state table store one of the following: one or more network statistics or a network status.

31. The method of claim 17 wherein the target network configuration state table and the corresponding network configuration state table store one of the following: one or more packet filter rules or one or more packet forward rules.

32. The method of claim 23 wherein the updated network configuration state table and the target network configuration state table are stored in cache.

33. The computer program product of claim 18 wherein the synchronizing application receives the instruction from a process that monitors changes in the network configuration state tables in both the operating system kernel in the host and stored in the attached ASIC switch device.

34. The computer program product of claim 33 wherein the monitor process involves either a polling message or a message from the operating system used to notify processes of changes.

35. The computer program product of claim 18 wherein the synchronizing application receives the instruction in response to the operating system state becoming incomplete or invalid; and wherein the target network configuration state table is in the operating system kernel in the host and the corresponding network configuration state table is stored in the attached ASIC switch device.

36. The computer program product of claim 18 wherein the synchronizing application receives the instruction after a certain number of values in one or more network configuration state tables have been updated and comprising further computer instructions for:

retrieving data from each network configuration state table with an updated value and retrieving data from each corresponding target network configuration state table; and for each of the updated values, sending an instruction to update the corresponding target network configuration state table with the updated value.

37. The computer program product of claim 18 wherein the target network configuration state table and the corresponding network configuration state table are forwarding information databases.

38. The computer program product of claim 37 wherein the target network configuration state table and the corresponding network configuration state table are one of the following: a routing table or a MAC table.

39. The computer program product of claim 18 wherein the target network configuration state table and the corresponding network configuration state table store one of the following: a port state, one or more counters, one or more speed settings or one or more medium settings.

40. The computer program product of claim 18 wherein the target network configuration state table and the corresponding network configuration state tables store one of the following: one or more network statistics or a network status.

41. The computer program product of claim 18 wherein the target network configuration state table and the corresponding network configuration state table store one of the following: one or more packet filter rules or one or more packet forward rules.

42. The computer program product of claim 33 wherein the updated network configuration state table and the target network configuration state table are stored in cache.

* * * * *